United States Patent [19]

Bone et al.

[11] Patent Number: 5,778,154
[45] Date of Patent: *Jul. 7, 1998

[54] ADVISOR SYSTEM AND METHOD FOR DETERMINING RESERVOIR PROPERTIES

[75] Inventors: Russell L. Bone; Meri Lynn Gobran; Tsai-Bao Kuo, all of Plano, Tex.

[73] Assignee: Atlantic Richfield Company, Los Angeles, Calif.

[*] Notice: The terminal 9 months of this patent has been disclaimed.

[21] Appl. No.: 97,643

[22] Filed: Nov. 1, 1993

[51] Int. Cl.$^6$ .................................................. G06F 17/00
[52] U.S. Cl. ...................... 395/50; 395/75; 395/77; 395/54
[58] Field of Search .................... 395/50, 51, 76, 395/902, 928, 929, 934, 3, 10–11, 60–61

[56] References Cited

U.S. PATENT DOCUMENTS 5,133,045   7/1992   Gaither et al. ................................ 395/51

OTHER PUBLICATIONS

Choy, C. S. "Gate Array Selection Advisor System" Circuits & Systems, 1991 IEEE Midwest Symposium.

Janson, Jennifer L. "Burk Installs VAX Stations to Speed Customer Service." Digital Review Mar. 19, 1990.

Haskin, Denis W. and Jeffrey A. Steinberg. "VAXstation 3100." Digital Review. Feb. 6, 1989 pp. 55–59.

Bullon, Melinda–Carol. "Updated Expert System to Support DECwindows." Digital Review. Sep. 11, 1989 p. 23.

XLib Programming Manual. Adrian Nye. 1992.

Cannon et al. "An Expert System as a Component of an Integrated System for Oil Exploration." Proceedings 1989 Southeastcon.

*Primary Examiner*—Tariq R. Hafiz
*Attorney, Agent, or Firm*—Joseph D. Yao

[57] ABSTRACT

An advisor system and method for determining reservoir properties includes a processor accessible to a tutorial system module and an expert system module. An input/output interface accesses directly with the tutorial system module and with the expert system module through a bridge. The expert system module includes a "help" utility, a rule base, a correlations library and a program interface between the library and rule base. Based on the input, the rule base selects correlation subroutines from the correlation routine library necessary to determine the reservoir properties. The advisor system can provide advice on using available Pressure-Volume-temperature (PVT) laboratory reports and location of the reservoir property in the PVT laboratory report.

14 Claims, 7 Drawing Sheets

Company——————————————  File——————————

Well—————————————————  County————————

Field—————————————————  State—————————

Table of contents

| | Page |
|---|---|
| Well Information | 1 |
| Summary of PVT Data | 2 |
| Composition of Reservoir Fluid Sample | 3 |
| Volumetric Data of Reservoir Fluid | 4 |
| Pressure-Volume Relations Data | 5 |
| Differential Vaporization Data | 6 |
| Differential Vaporization Graphs | 7-8 |
| Viscosity Data | 9 |
| Viscosity Graph | 10 |
| Separator Tests of Reservoir Fluid and Differentially Prepared Oils | 11-13 |
| Summary of Adjusted Data-Differential Vaporization Adjusted to Surface Conditions | 14 |
| Nomenclature and Equations to Adjusted Differential Vaporization to Surface Conditions | 15 |

*Fig. 3*

| | Advisor | |
|---|---|---|
| | Reservoir Properties | |

76 — Select the properties you want to determine

- ☐ Bg        ☐ Bo              ☐ Bw
- ☐ Cg        ☐ Co              ☐ Cw
- ☐ Z factor  ☐ Rs              ☐ Rsw
- ☐ Pc        ☐ Oil Viscosity   ☐ Water Viscosity
- ☐ Tc        ☐ Gas Viscosity
- ☐ Bubble Point Pressure
- ☐ Brine Saturation Pressure Rock Properties   ○ YES
                  ⦿ NO

| Exit | Help |  | Back | Go |

| | Advisor | |
|---|---|---|
| | Operation Data (Oil) | |

Oil Gravity:    [ 25 ] °API     — 88
Producing GOR: [ 200 ] SCF/STB  — 90

If you don't know the GOR but know that the oil is saturated, please input 3700 for GOR.

Separator Pressure:    [ 150 ] PSIG  — 92
Separator Temperature: [ 120 ] °F    — 94

| Exit | Help |  | Back | Go |

ADVISOR SYSTEM AND METHOD FOR DETERMINING RESERVOIR PROPERTIES

BACKGROUND OF THE INVENTION

1. Field of the Invention

This invention relates to an advisor system and method for determining petroleum reservoir properties (oil, gas, water, rock, and flow properties) of a particular site.

2. Background

Reservoir fluid and rock properties are basic parameters required in reservoir and production analyses. Field engineers need to know where and how to obtain required reservoir property data for engineering analyses, and process and equipment designs. Much of this data can be found in Pressure-Volume-Temperature (PVT) laboratory reports where the physical properties of oil and gas samples are measured for a variety of sites. In many cases, the fluid and rock properties for specific reservoirs have not been measured in laboratories and correlations must be used.

The PVT laboratory reports are the primary source of information for reservoir fluid properties. Determining the physical properties of oil or gas from a PVT report is, however, not trivial. It requires an understanding of each laboratory process involved as well as a knowledge of the data applicability. This background information is important, and is not always stated explicitly in the report. It can, therefore, be easily overlooked or forgotten.

In practice, laboratory reports are not always available; and some reservoir property data cannot be found in conventional PVT reports. Many statistical correlation methods have been developed that obtain reasonable estimates for the required properties. However, in using these correlation methods, analysts often need assistance in choosing the appropriate one, and experts are generally located at a central location away from field locations.

SUMMARY OF THE INVENTION

In accordance with this invention, reservoir properties can be determined by an advisor system having a processor accessible to an expert system module and a tutorial system module. An input device accesses the processor to retrieve information from the tutorial system module and/or the expert system module. This information is then displayed on an output device to the user.

The advisor system provides the user two types of information. The first type of information relates to data found in a PVT laboratory report. The tutorial system module provides this information in an interactive text and graphical explanation facility. Background information is given to assist the user in interpreting data commonly found in PVT laboratory reports. It allows the user to explore the significance of each section of a typical PVT laboratory report.

The second type of information is gathered from the expert system module where problems are solved by interactively consulting with the user. Input information such as field operating conditions is requested from the user and used in correlations to calculate the physical properties that have not been measured in a laboratory. For some properties where there is more than one applicable correlation, the system will suggest the best correlation to use based on the input data. The user may choose to use this correlation or override the selection. In either case, the calculations are carried out after all selections are made.

One advantage of the advisor system is that expert guidance in determining reservoir fluid and rock properties can be provided to inexperienced engineers. The advisor system allows the transfer of expertise from reservoir property experts at a central location to field engineers at locations worldwide. A further advantage is that background information on various subjects of interest in the PVT laboratory reports may be easily obtained.

BRIEF DESCRIPTION OF THE DRAWING

The invention is described by the following, along with appended claims and accompanying drawings in which:

FIG. 3 is an exemplary table of contents page from a standard PVT laboratory report.

FIG. 5 is an exemplary screen of reservoir properties to be selected.

FIG. 6 is an exemplary screen of a data input for operational conditions.

DESCRIPTION OF A PREFERRED EMBODIMENT

Figure 1:
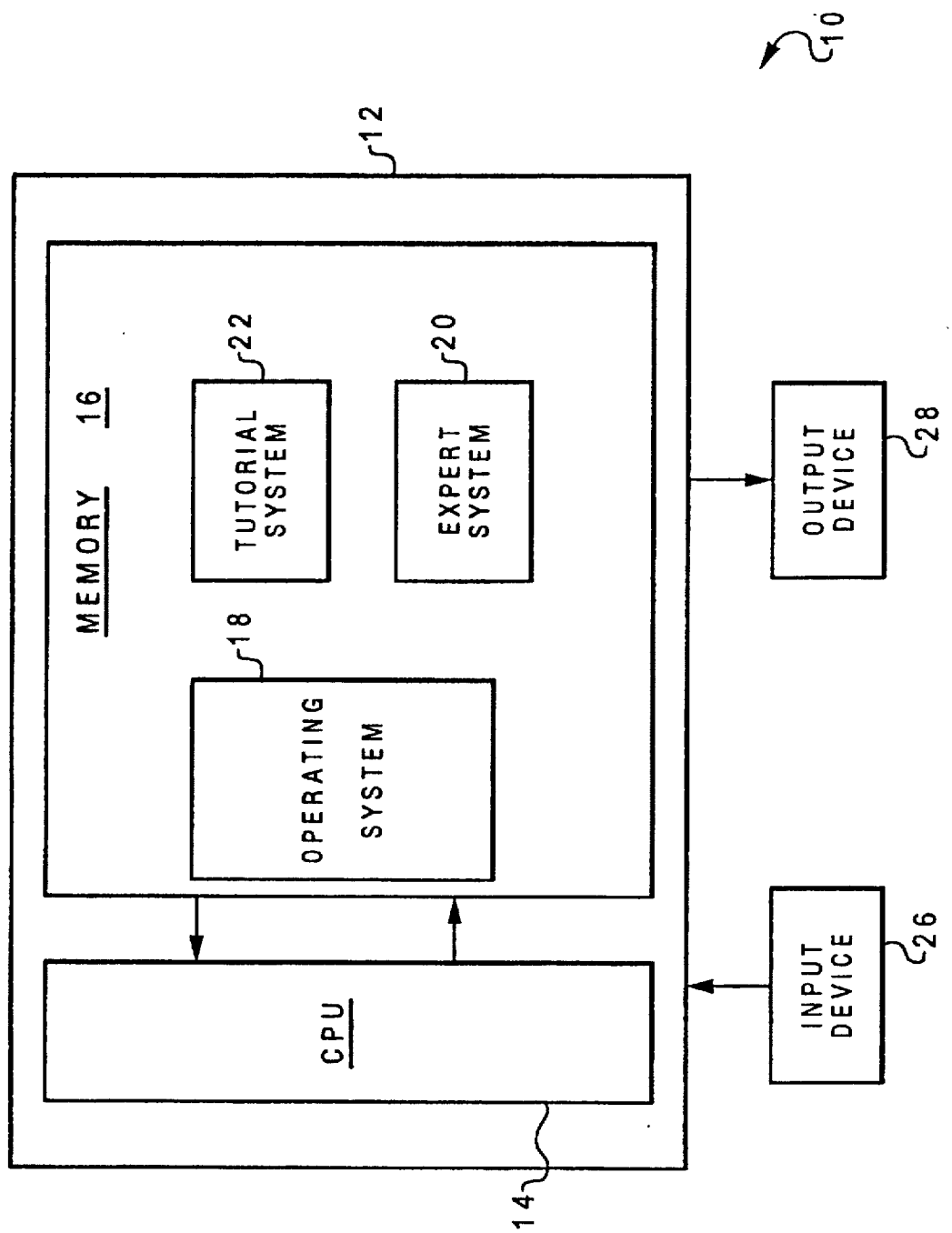
FIG. 1 is a block diagram of an advisor system for determining reservoir properties which embodies the present invention.

FIG. 1 shows a schematic diagram illustrating the advisor system 10 having a computer 12 with a processor 14, and memory 16 loaded with an operating system 18, an expert system module 20, and a tutorial system module 22. The computer 12, through the operating system 18, interacts with an input device 26, such as a mouse or keyboard, and output device 28, such as a video monitor or printer. The advisor system 10 allows a user to make a query through the input device 26 to the processor 14. The processor 14, through the operating system 18, accesses the expert system module 20 and tutorial system 22 for information and data to be presented to the user through the output device 28.

Figure 2:
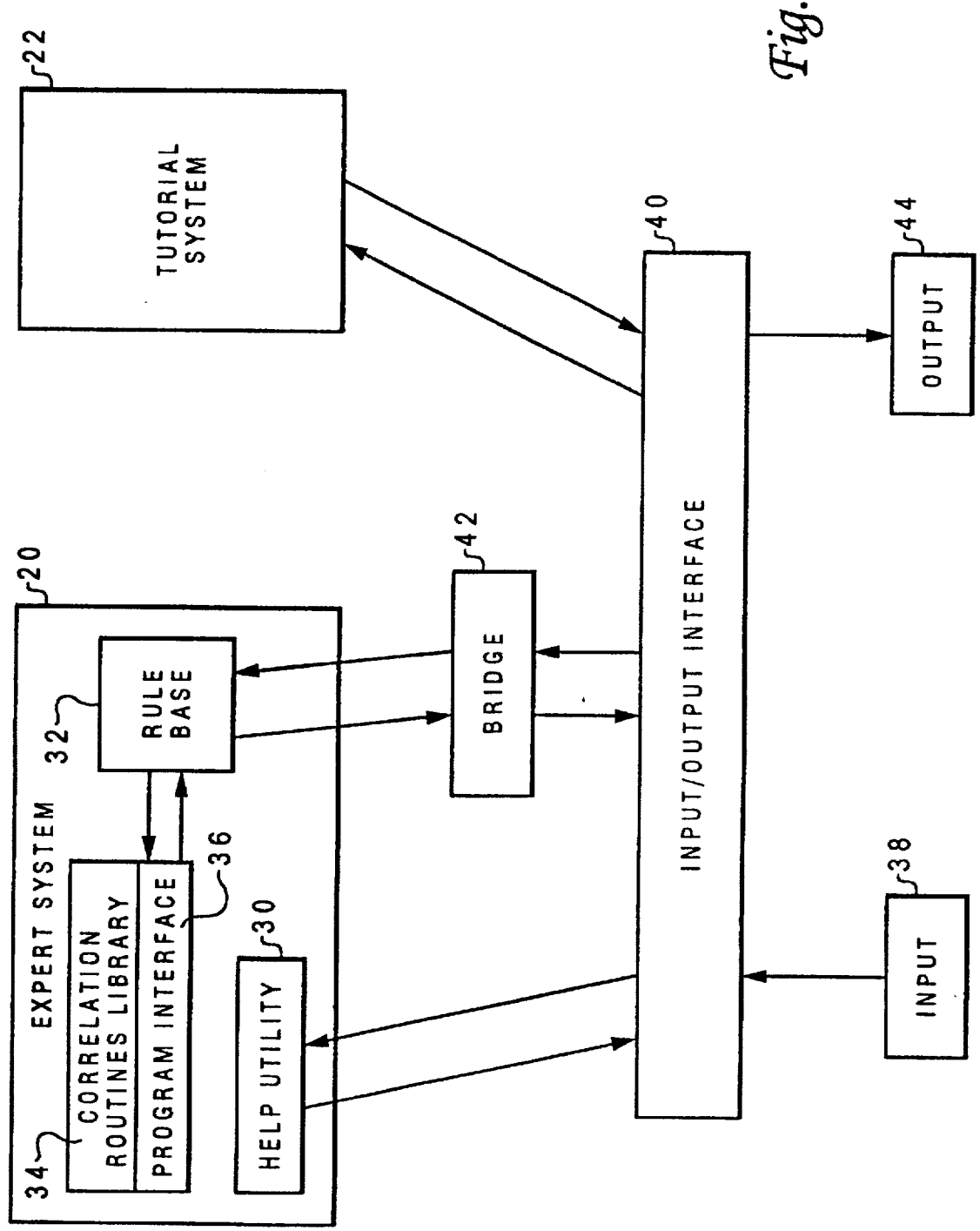
FIG. 2 is a schematic diagram of the advisor system for determining reservoir properties for this invention.

The schematic diagram in FIG. 2 shows that the expert system 20 is made up of a help utility 30, a rule base 32, and a correlation library 34. The library 34 includes computational subroutines coded in the C language. Each subroutine exists in an individual file and is called by a corresponding rule in the rule base 32 when needed. It is not necessary that the original subroutines be specifically developed for this particular project.

The rule base 32 directs the use of correlation subroutines from the correlation library 34 and acts as the control structure or rule interpreter for the expert system 20. The rule base 32 operates the expert system 20 by deciding how and when the rules are to be applied to the problem, given the input, to achieve an acceptable solution.

Providing a program interface 36 with the correlation library 34 allows each subroutine to communicate with the rule base 32. The program interface 36 is highly modularized with one interface for each subroutine, thus leaving the original subroutines intact. This approach provides for efficient system maintenance and conversion to other computer platforms.

The help utility 30 is a series of windows accessible either individually or as a session. Each help window contains a snapshot of its corresponding user interface screen and detailed information related to that screen.

The advisor system 10 receives input 38 through input/ output interface 40. After accessing either the expert system 20 or the tutorial system 22, the input/output interface 40 provides an output 44. This input/output interface 40 is developed by using a hypertext tool. It is designed to provide a window type of input/output (I/O) facility to the help utility 30, the tutorial system 22 and the rule base 32 via a bridge 42. The I/O windows are associated with questions and messages prompted by the rule base 32. The I/O facility may sometimes be developed under a completely different environment from the expert system 20. When a large number of I/O objects are involved, the maintenance of the functions operating on user interface objects, such as buttons, lists, fields and windows become tedious. Messages passing between these two environments also become heavily loaded. To facilitate such communication, the bridge 42 becomes necessary. This bridge's 42 basic function includes:

1) associating the objects appearing in user interface windows with the objects used in the rule base 28;
2) initializing and resetting object values; and
3) type and range checking of the input values.

Generally, the bridge 42 is machine independent and can be easily transported from one platform to another.

The help utility 30 of the expert system 20 provides on-line assistance to the user on how to use each interface screen and is available at all times. The help utility 30 is a series of windows accessible either individually or as a session. Each help window contains a snapshot of its corresponding user interface screen and detailed information related to that screen.

The tutorial system module 22 is an interactive text and graphical explanation facility. It allows users to explore the significance of each section or column in every page of a standard PVT laboratory report. As shown in FIG. 3, a variety of information is available in a report, such as well information, fluid composition, relational data graphs, and other information. PVT experimental processes, such as constant composition expansion and differential liberation are represented in a graphical, animated fashion to give the user a better understanding of how the data are obtained. The tutorial system 18 is able to support several samples of PVT laboratory reports, such as the conventional industry format or other user-configured formats.

Figure 4:
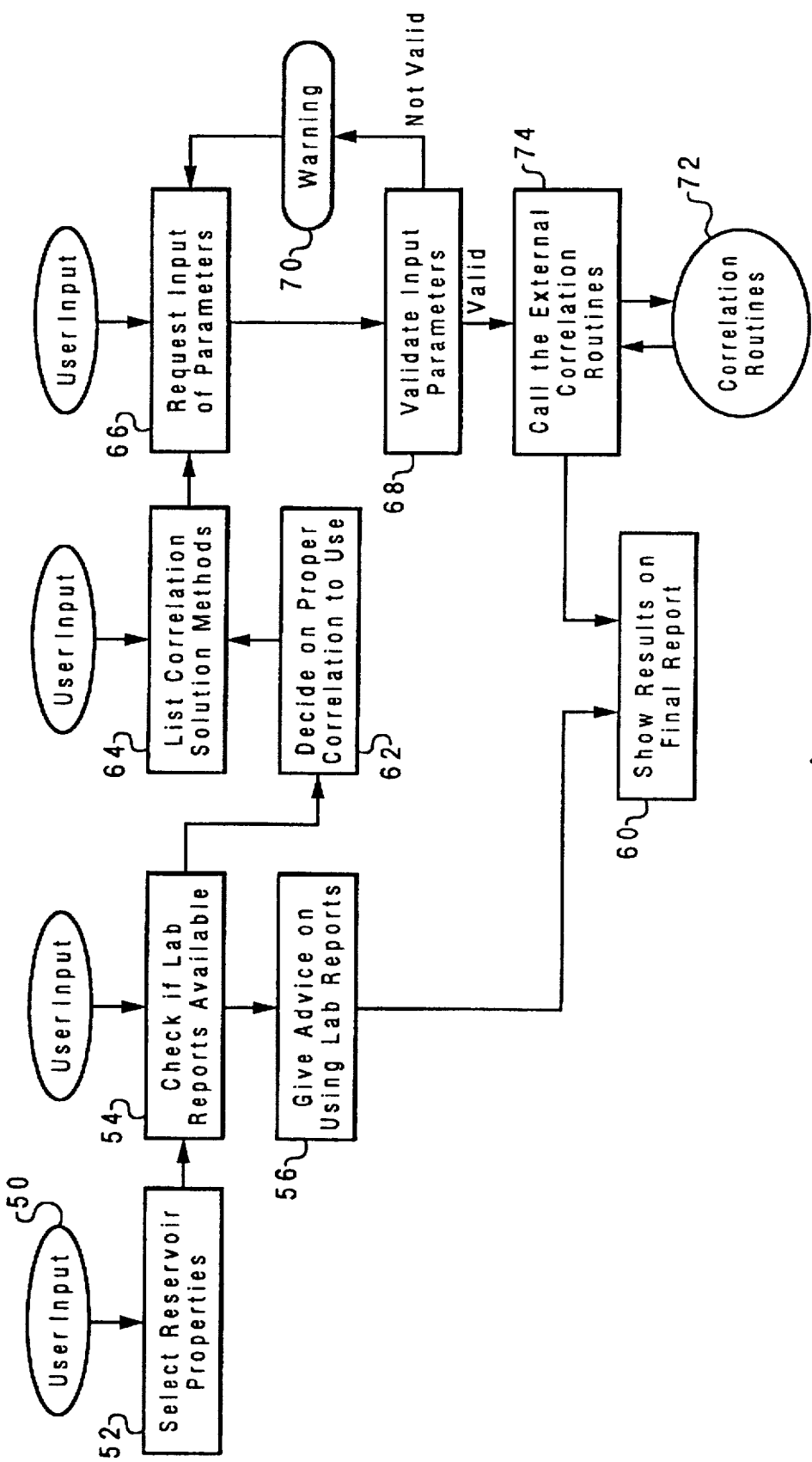
FIG. 4 is a schematic diagram of data flow through the advisor system of the invention.

The advisor system 10 is designed to be interactive with the user. FIG. 4 shows data interchange between the user and the advisor system 10. In a typical consultation, the advisor system 10 asks for user input (step 50) in selecting the properties to be determined (step 52).

The advisor system 10 then asks the user if laboratory reports are available (step 54). If user input 50 is "yes", the advisor system 10 provides advice on using the available laboratory reports (step 56) and the location where a particular reservoir property can be found on a standard PVT laboratory report or a user customized PVT laboratory report (step 60).

If laboratory reports are not available to the user, the advisor system 10 selects the most appropriate correlation methods to be used (step 62) based on user input data. It then lists the available correlation solution methods that can determine the reservoir properties (step 64). If there is more than one solution method, the user then determines which solution method to use so that the advisor system 10 can request input of parameters, such as field operating conditions (step 66). The user inputs the appropriate information, which is then validated by the advisor system 10 (step 68). If there are incorrect or invalid parameters, a warning message (step 70) is provided to the user and the advisor system 10 again prompts the user for valid operating parameters (step 66). Once all the input parameters have been validated as correct, the advisor system 10 calls the correlation subroutines 72 from the correlation library 30 of the expert system 16 (step 74). The advisor system 10 then calculates the values for the reservoir properties selected and provides the results on a final report (step 60).

In one form of the advisor system 10, a selection screen (shown in FIG. 5) allows the user to select one or more of a number of reservoir properties 76. The user also has the option to "exit" 78, enter the "help" utility 80, back up to the previous page 82, or continue through the advisor system 10 by entering "go" 84.

Depending on the reservoir properties 76 being determined, the advisor system 10 will ask the user if PVT laboratory reports are available. If the user responds that PVT laboratory reports are available, the advisor system 10 accesses the tutorial system 22 via the bridge 42. The tutorial system 22 then finds the location in a standard PVT laboratory report or a user customized report for a particular reservoir property. The advisor system 10 displays this information on output device 28 via the input/output interface 40. If the user has any questions with respect to a particular reservoir property or location on the PVT laboratory report, the user may enter the "help" utility 80 for added information.

If PVT laboratory reports are not available, the advisor system 10 will determine correlation solution methods to determine the selected reservoir properties 76. Input 38 is received into the input/output interface 40, which accesses the rule base 32 via bridge 42. The advisor system 10 reviews the correlation subroutines in the correlation library 34 through the program interface 36. If more than one correlation solution method is available, the user has an option to select a preferred method.

Figure 7:
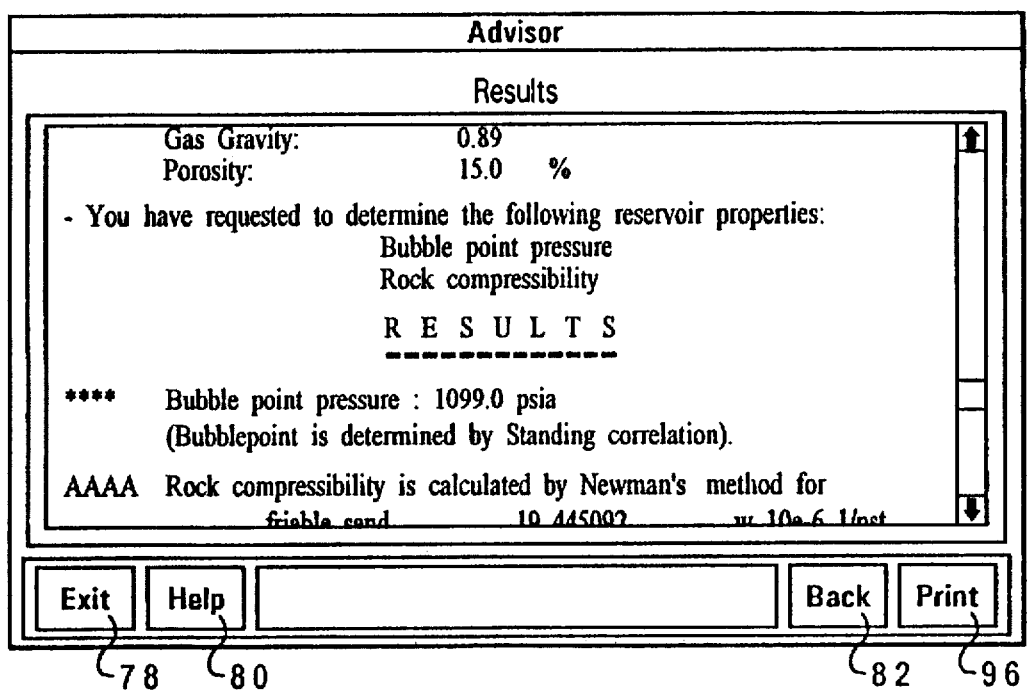
FIG. 7 is an exemplary screen of resulting values for reservoir property selections.

After the preferred method has been selected, the advisor system 10 queries the user for operational data through the operation data screen for oil (shown in FIG. 6). Requested parameters for this scenario are: oil gravity 88, producing GOR 90, separator pressure 92, and separator temperature 94. After this information has been entered, the advisor system 10 calculates the values for the reservoir properties 76 and presents them in a result screen (shown in FIG. 7). The user may read the results and/or print (96) a hard copy of the results.

Figure 8:
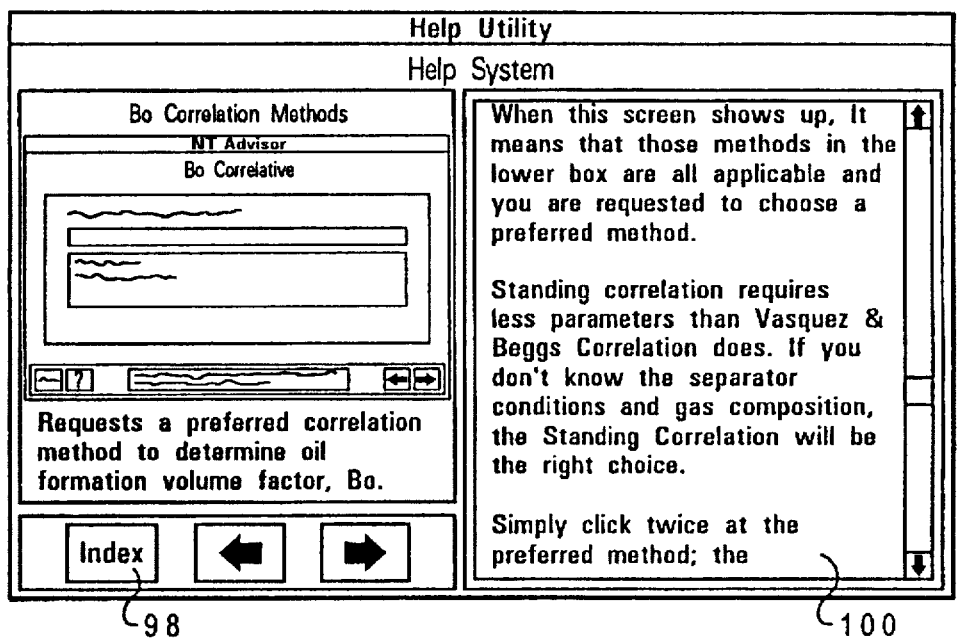
FIG. 8 is an exemplary screen of the help utility of the advisor system of the invention.

The user may go to the "help" utility (shown in FIG. 8) at any time during a session while using the advisor system 10. The "help" utility provides an index 98 from which to select subjects of interest and an explanation box 100 to provide information about a particular subject.

Figure 9:
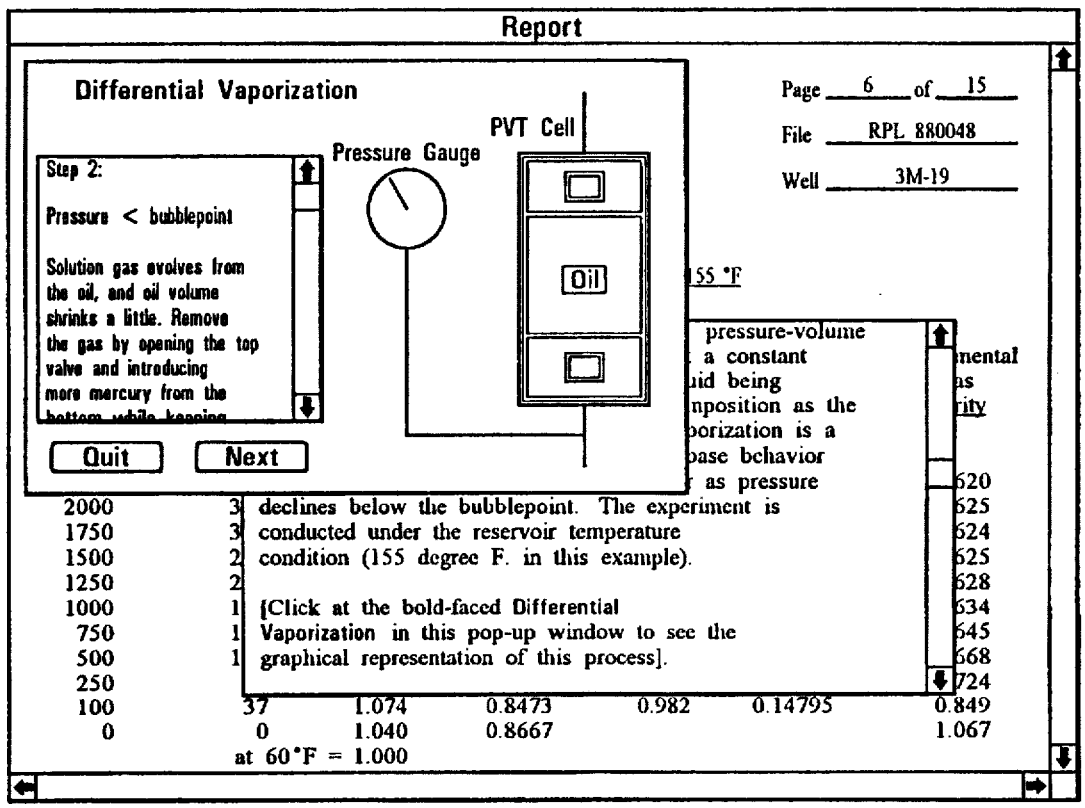
FIG. 9 is an exemplary screen from the tutorial system module of the advisor system of the invention.

The tutorial system provides interactive text and a graphical explanation facility (shown in FIG. 9). It is a graphical animation of information that gives the user a better understanding of how data are obtained and what they mean.

The result of a consultation is written to an output file using a report generation template. The contents of the output file are also displayed in a window that allows users to examine and print the results. The template is a file containing a collection of output commands that the rule base 32 uses to produce the output file.

Along with recommending appropriate correlation methods, the rule base 32 also performs parameter consolidation and validation. When the advisor system 10 needs to use multiple correlations to determine multiple reservoir properties, it will combine all of the required input parameters in one set. The user is only required to input the composite parameters once. Even though each correlation subroutine uses a separate set of parameters, the system checks each input parameter against the applicable range for each required correlation. If any parameter is out of the optimum applicable range, the system will issue a warning in the results report.

This advisor system and method provides an effective means to integrate a large amount of knowledge in the area of reservoir property determination. It facilitates the transfer of basic reservoir engineering technology from multiple experts located in a centralized research center to field engineers at worldwide sites.

It is to be understood that the terminology as employed in the description and claims incorporated herein, is used by way of description and not by way of limitation to facilitate understanding of the structure, function and operation of the combination of elements which constitute the present invention. Moreover, while the foregoing description and drawings illustrate in detail, working embodiments of the invention to those skilled in the art to which the present invention relates, the present disclosure will suggest many modifications in construction, as well as widely differing embodiments and applications without thereby departing from the spirit and scope of the invention. The present invention, therefore, is intended to be limited only by the scope of the appended claims and the applicable prior art.

What is claimed is:

1. A method for using an advisor system to determine reservoir properties of a site, comprising the steps of:

allowing user selection from a menu of choices of at least one reservoir property to be determined pertaining to the site;

receiving input of field operation conditions pertaining to the site into the advisor system;

determining whether or not a Pressure-Volume-Temperature laboratory report is available to the advisor system corresponding to the selected at least one reservoir property;

upon said determination that said report is available, indicating to said user where the at least one reservoir property is located in the report;

upon said determination that said report is not available, selecting at least one applicable correlation method for determining the at least one reservoir property, and when more than one method is selected, allowing the user to further select which of the applicable correlation methods to use;

calculating the at least one reservoir property using the selected correlation method; and outputting the calculated value of the at least one reservoir property using the selected correlation method.

2. The method, as set forth in claim 1, further comprising the steps of, upon said determination that a Pressure-Volume-Temperature laboratory report is not available to the advisor system:

receiving input of field operation conditions pertaining to the selected correlation method;

upon receipt of invalid input parameters of field operation conditions, outputting a warning to the user and prompting the user for the receipt of valid input parameters;

upon receipt of valid input parameters, calculating the at least one reservoir property by using the selected correlation method and the valid input parameters; and outputting the calculated value of the at least one reservoir property.

3. A method for using an advisor system to determine reservoir properties of a petroleum site, comprising the steps of:

allowing the selection from a menu of choices of at least one reservoir property to be determined pertaining to the site;

receiving input of field operation conditions pertaining to the site into the advisor system;

determining if a Pressure-Volume-Temperature laboratory report is available to the advisor system relating to said operation conditions;

determining where the at least one reservoir property is located in the report if the report is available;

designating applicable correlation methods for determining the at least one reservoir property when a Pressure-Volume-temperature laboratory report is not available within the advisor system;

allowing the user to select among the applicable correlation methods the preferred applicable correlation method;

calculating the at least one reservoir property by using the selected correlation method; and outputting the location of the at least one reservoir property on the Pressure-Volume-Temperature laboratory report if the standard Pressure-Volume-Temperature laboratory report is available or the calculated value of the at least one reservoir property using the selected correlation method if the standard Pressure-Volume-Temperature laboratory report is unavailable.

4. The method of claim 3 further comprising the step of:

upon said report not being available, designating at least one applicable correlation method for determining the at least one reservoir property, and when more than one method is designated, suggesting to the user a preferred one of the applicable correlation methods to use based upon the input of field operation conditions.

5. An advisor system for determining reservoir properties of a petroleum site, comprising:

an expert system module, having a rule base and a correlation routine library such that a subroutine in said correlation routine library is called by a corresponding rule in said rule base;

a tutorial system module;

a processor accessible to the expert system and tutorial system modules;

an input device accessible to said processor which retrieves information from said tutorial system module and said expert system module; and an output device to display the retrieved information;

said processor including instructions for allowing the selection from a menu of choices of at least one reservoir property to be determined pertaining to the site; receiving input of field operation conditions pertaining to the site into the expert system module; determining if a Pressure-Volume-Temperature laboratory report is available relating to said operation conditions; determining where the at least one reservoir property is located in the report if the report is available; and designating applicable correlation methods from said correlation routine library for determining, using the rule base, the at least one reservoir property when a Pressure-Volume-temperature laboratory report is not available, such that a selection can be made of which of the applicable correlation methods is to be used for the determination when more than one applicable correlation method is available.

6. The advisor system, as set forth in claim 5, wherein said expert system further comprises a help utility which is a series of windows accessible by a user for detailed information related to a particular screen.

7. The advisor system, as set forth in claim 6, further comprises an input/output interface for communicating with said help utility, said rule base and said tutorial system.

8. The advisor system, as set forth in claim 7, further comprises a bridge between said input/output interface and said rule base.

9. The advisor system, as set forth in claim 8, wherein said expert system further comprises a program interface between said rule base and said correlation library.

10. The system of claim 5 wherein said processor further comprises instructions for upon said report not being available, selecting at least one applicable correlation method for determining the at least one reservoir property, and when more than one method is provided, suggesting to the user a preferred one of the selected applicable correlation methods to use based upon the input of field operation conditions.

11. A computer-readable media comprising a computer program for use in an advisor system to determine reservoir properties of a site, comprising:
   one reservoir property to be determined pertaining to the site;
   instructions for receiving input of field operation conditions pertaining to the site into the advisor system;
   instructions for determining whether or not a Pressure-Volume-Temperature laboratory report is available to the advisor system corresponding to the selected at least one reservoir property;
   instructions for upon said determination that said report is not available, selecting at least one applicable correlation method for determining the at least one reservoir property, and when more than one method is selected, allowing the user to further select which of the applicable correlation methods to use;
   instructions for calculating the at least one reservoir property using the selected correlation method; and
   instructions for outputting the calculated value of the at least one reservoir property using the selected correlation method.

12. The computer-readable media of claim 11 further comprising instructions for instructions for upon said determination that said report is available, indicating to the user where the at least one reservoir property is located in the report.

13. The computer-readable media, as set forth in claim 11, further comprising instructions for upon said determination that a Pressure-Volume-Temperature laboratory report is not available to the advisor system:
   receiving input of field operation conditions pertaining to the selected correlation method;
   upon receipt of invalid input parameters of field operation conditions, outputting a warning to the user and prompting the user for the receipt of valid input parameters;
   upon receipt of valid input parameters, calculating the at least one reservoir property by using the selected correlation method and the valid input parameters; and
   outputting the calculated value of the at least one reservoir property.

14. A computer-readable media comprising a computer program for use in an advisor system to determine reservoir properties of a petroleum site, comprising:
   instructions for allowing the selection from a menu of choices of at least one reservoir property to be determined pertaining to the site;
   instructions for receiving input of field operation conditions pertaining to the site into the advisor system;
   instructions for determining if a Pressure-Volume-Temperature laboratory report is available to the advisor system relating to said operation conditions;
   instructions for determining where the at least one reservoir property is located in the report if the report is available;
   instructions for designating applicable correlation methods for determining the at least one reservoir property when a Pressure-Volume-temperature laboratory report is not available within the advisor system;
   instructions for allowing the user to select among the applicable correlation methods the preferred applicable correlation method;
   instructions for calculating the at least one reservoir property by using the selected correlation method; and
   instructions for outputting the location of the at least one reservoir property on the Pressure-Volume-Temperature laboratory report if the standard Pressure-Volume-Temperature laboratory report is available or the calculated value of the at least one reservoir property using the selected correlation method if the standard Pressure-Volume-Temperature laboratory report is unavailable.

* * * * *